United States Patent [19]

Schiffer

[11] Patent Number: 5,547,112

[45] Date of Patent: Aug. 20, 1996

[54] POURING EDGE STRUCTURE FOR ELIMINATING DRIBBLE

[75] Inventor: Larry W. Schiffer, Manitowoc, Wis.

[73] Assignee: Anchor Hocking Corporation, Freeport, Ill.

[21] Appl. No.: 491,499

[22] Filed: Jun. 16, 1995

[51] Int. Cl.$^6$ ........................................................ B65D 5/74
[52] U.S. Cl. .................................................... 222/571
[58] Field of Search .............................................. 222/571

[56] References Cited

U.S. PATENT DOCUMENTS

| 1,663,317 | 3/1928 | Richheimer | 222/571 |
| 2,442,047 | 5/1948 | Kemper | 222/571 |
| 3,145,887 | 8/1964 | Reller et al. | 222/571 |
| 3,423,234 | 1/1969 | Heine | 222/571 X |
| 3,549,062 | 12/1970 | Teetor | 222/571 |
| 3,868,051 | 2/1975 | Goof | 222/571 |
| 4,591,078 | 5/1986 | Weissman | 222/571 X |

FOREIGN PATENT DOCUMENTS

| 1021853 | 2/1953 | France | 222/571 |
| 3233609 | 12/1983 | Germany | 222/571 |
| 615214 | 5/1946 | United Kingdom | 222/571 |

*Primary Examiner*—Kevin P. Shaver
*Attorney, Agent, or Firm*—Baker & McKenzie

[57] ABSTRACT

A drip-less vessel has a flange at its upper end which is angled at about 30° with respect to the horizontal, a ramp of approximately ⅜" located behind the junction of the inner surface and the edge of the vessel, and a smooth internal contour with direction changing surfaces blended into one another so as to avoid sharp or noticeable protrusions which could be sensed by the sensitive tissues of the mouth of a user.

6 Claims, 1 Drawing Sheet

POURING EDGE STRUCTURE FOR ELIMINATING DRIBBLE

This invention pertains generally to vessels which, when tilted to discharge the liquid contents thereof over the edge, preclude either dribble, or individual drips, to occur when the vessel is returned to its usual normally upright position at the rate of return tilt movement which a user ordinarily employs when returning the vessel to an upright condition. The invention pertains specifically to the construction of an upper, pouring edge portion of a vessel which precludes dribble, or dripping, from the vessel when the vessel is return tilted to a normal upright condition under the hand applied forces usually employed by a user when manipulating the vessel. In this application and the appended claims the term. "dribble" will be used to denote a condition in which a small but continuous, or near continuous, flow of liquid occurs in an irregular fashion, said condition including momentary periods of no flow interspersed with individual drops, when the vessel is returned to its normal upright position. "Dripping" denotes a condition of liquid flow in which the flow is composed of individual drops when the vessel is returned to its normal upright condition following pouring.

BACKGROUND OF THE INVENTION

A vessel construction which provides steady continuous discharge of liquids therefrom when the vessel is tilted to a discharge position, and a sharp cut-off of flow when the vessel is return tilted to a normal upright condition, has long been an objective of both vessel manufacturers and users alike. The need for such a construction is particularly acute in connection with liquids of a thick and viscous nature, such as maple syrup. However, the problem also is common to highly fluid liquids, such as tea when poured from a tea pot. When dribble or dripping occurs a portion of the liquid is wasted, the post-pouring dribble or dripped liquid may fall onto a surface which is not intended to receive it such as the user's clothing or the floor, the vessel takes on an unsightly appearance which can become worse as time passes with the entrapment of dirt therein, and an unsanitary condition can develop over time. Proposals have been made to eliminate this problem but it is believed that all such proposals have one or more disadvantages which has prevented any construction of choice to evolve. Typical of the attempts which have been made to develop such a construction which have not gone into widespread use (if, indeed, into any commercial use) is the construction shown in the Reller et. al. U.S. Pat. No. 3,145,887 in which a ledge shoulder located just behind the distal end or edge of the vessel is employed as a dam to provide a dripless rim. While such structure may be effective to reduce or even prevent dripping, the dam generates a sharp edge or protrusion which is unpleasant to the sensitive tissues of the mouth and thus, for this reason, it is believed that such a construction has not gone into significant, if any, use.

SUMMARY OF THE INVENTION

The invention is vessel rim constructed so that when the vessel is returned to its normal upright position the pouring stream is suddenly and cleanly terminated without post-pouring dribble or drip. Further, the invention functions equally well with highly viscous and highly fluid liquids such as maple syrup and water. The foregoing is accomplished by a structure which is smooth in contour with respect to the portions of the upper rim area of the vessel which come into sliding contact with the sensitive tissues of the mouth during use as a drinking vessel so the user experiences no unpleasant sense of touch sensation when using the vessel. In the preferred embodiment the upper portion of the vessel has a flange which, in a normal, upright condition, is angled at about 30° C. with respect to the horizontal, has a ramp at the extremity of the flange of no less than about 0.4 inches, a smooth surface over all areas which come into sliding contact with the mouth in normal use, and have formed an approximately 90° C. or, acute, angle at the junction of the flange ramp and the edge of the vessel.

BRIEF DESCRIPTION OF THE DRAWING

The invention is illustrated more or less diagrammatically in the accompanying drawing wherein.

DESCRIPTION OF THE INVENTION

Figure 1:
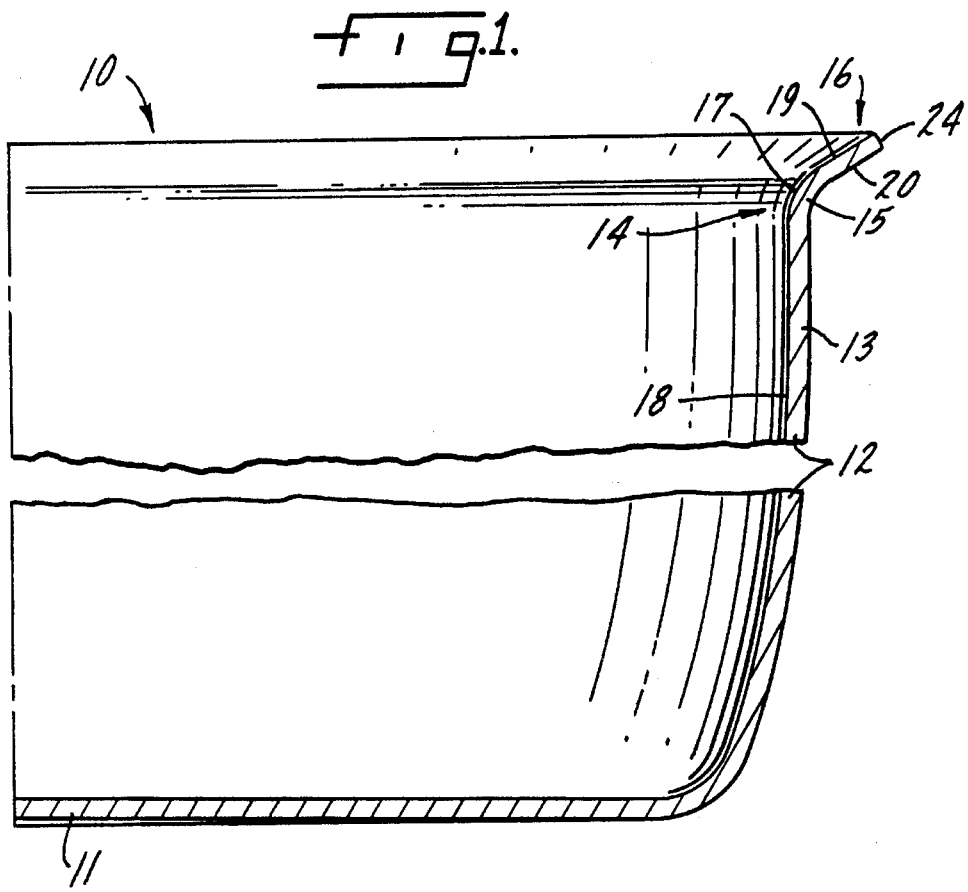
FIG. 1 is a partial vertical section through a vessel having the drip-less rim of the present invention, a portion of the vessel being broken away for clarity.
Figure 2:
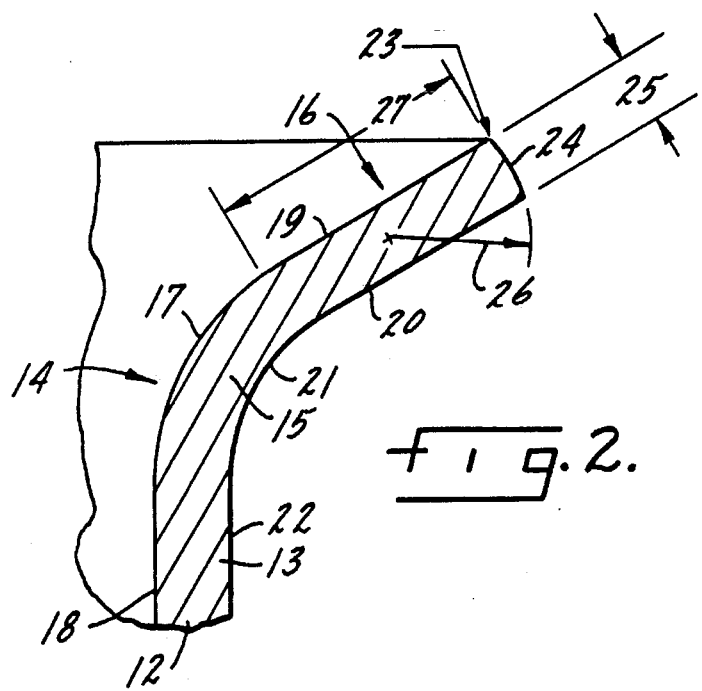
FIG. 2 is a detail, to an enlarged scale as shown in FIG. 1 of the outermost rim of a vessel having the drip-less feature of the present invention.

Like reference numerals will be used to refer to like or similar parts from Figure to Figure in the following detailed description of the invention.

Referring first to FIG. 1, a vessel adapted to receive, contain and discharge liquids is indicated generally at 10. The vessel includes a bottom 11 and a side wall 12, the side wall being broken to indicate that the depth of the vessel is not relevant to the drip-less feature of the invention. At the upper most end portion 13 of the generally vertical side wall 12 a bend, indicated generally at 14, is formed. The upper portion of the bend, indicated at 15, connects to a flange or lip indicated generally at 16. As can be clearly seen in both Figures, the inner surface 17 of bend 14 is smooth throughout its entire extent and blends smoothly and without a projection or depression into the inner surface 18 of wall 12 at its lower end, and into the inside ramp surface 19 of lip 16. The outside surface 20 of the lip 16 is also smooth and contains no projections or depressions. Said outside lip surface 20, in this instance, blends smoothly into the outside surface 21 of bend 14 which, in this instance, blends smoothly into the outside surface 22 of wall 12. It will be understood that if the vessel is a vessel which is not designed or intended to be a drinking vessel, that is, to come into contact with the mouth tissues of a user, the outside surface of the lip 16, bend 14 and wall 12 need not, as a functional matter, be smooth. However, if the vessel is intended to come into contact with the mouth of a user, as in the case of a cup, a smooth surface is desired in order to avoid irritating contact between the lip of the vessel and the sensitive mouth tissues of the user.

The construction of the outer end portion of the lip or flange 16, in conjunction with (a) the angle of inclination of the lip with respect to the horizontal and (b) the smooth interior surfaces 16 and 17, at least, produce the unique drip-less function of the vessel.

The smooth lip or flange 16, and specifically the angle of inclination of wall 19, is preferably disposed at an angle of about 30 degrees with respect to the horizontal. Although it is believed that angles as low as about 25° C. and as great as 35° C. will be operative in many circumstances, an angle on the order of about 30° C. plus or minus 1° C. is preferred.

The junction 23 of the inner surface 19 of flange 16 and the edge 24 is also important in the preferred embodiment of the invention. The intersection should be no more than about a 90° C. angle, though it may be less. However, no matter what the angle, the radius of the junction line formed by the inner section of surface 19 and edge 24 should have a maximum radius of no more than 0.015 inches. In addition, the configuration of the edge 24 is significant in the functioning of the pouring structure. While a surface 24 which makes an exact 90° C., or lesser, angle with inner surface 19 will function in many cases, it is preferred that the edge 24 have a slight curvature. Specifically, the radius 26 of edge 24 should preferably be on the order of about 0.17 inches, though a range of 0.17 plus or minus 0.015 will also prove satisfactory with nearly all liquids.

The thickness of the lip 16 is, unexpectedly, also relevant to proper functioning of the pouring structure. Specifically the thickness 25 is preferably no less than about 0.080 inches, though thicknesses larger than that will occasionally give satisfactory results.

And finally, the length of the smooth, flat, planar ramp surface 19 is significant to satisfactory operation. Preferably surface 19 should have a minimum width 27 of about ⅜ inches to 0.4 inches. Slightly shorter lengths may be acceptable for some liquids but for all around general use a minimum width in the above described range preferred.

Of particular importance is that the inner surfaces, at least, be smooth and, at direction changing locations, blend imperceptibly into one another. As mentioned, the contour of the outer surface 20, 21, 22 is not quite so critical, depending upon whether the pouring vessel is intended to make contact with the mouth of user.

Although a preferred embodiment of the invention has been illustrated and described it will at once be apparent to those skilled in the art that modifications may be made within the spirit and scope of the invention. Accordingly it is intended that the scope of the invention be limited not by the foregoing exemplary description, but solely by the scope of the hereafter appended claims when interpreted in light of the relevant prior art.

I claim:

1. In a vessel having a generally vertically upwardly extending wall, a pouring structure at the upper portion of said wall which eliminates drip and dribble when both viscus and fluid liquids are poured over said pouring structure, said pouring structure including a flange located above the upper portion of the wall in the pouring area, said flange having a smooth inner surface whereby no protrusions or depressions are present between the upper portion of the wall and the flange and the outer most extremity of the flange, said flange also including an outer surface, said flange terminating at an edge, the edge having a convex curvature, said convex curvature being formed between the inner and the outer surfaces of the flange, the junction angle between the inner surface of the flange and the edge being about 90°, the junction angle between the outer surface of the flange and the edge being about 90°, the inner surface of the flange having a ramp which terminates at the junction of the inner surface of the flange and the edge, the inner surface of said flange, including the ramp, blending smoothly into the upper portion of the inner surface of the wall so that a smooth, continuous surface is formed between the upper end portion of the wall and throughout the inner surface of the ramp.

2. The pouring structure of claim 1 further characterized in that the angle of inclination of the flange with respect to the horizontal is in the range from about 25° to about 35°.

3. The pouring structure of claim 2 further characterized in that the angle of inclination of the flange with respect to the horizontal is on the order of about 30° C. plus or minus 1° C.

4. The pouring structure of claim 2 further characterized in that said ramp has a minimum radial length on the order of about ⅜ inches.

5. The pouring structure of claim 4 further characterized in that the outer surface of the pouring flange is smooth whereby no protrusions or depressions are present between the upper, outer portion of the wall and the junction between the edge and outer surface of the flange.

6. The pouring structure of claim 1 further characterized in that the outer surface of the pouring flange is smooth whereby no protrusions or depressions are present between the upper, outer portion of the wall and the junction between the edge and the outer surface of the flange.

* * * * *